HIGH SPEED ANALOG-DIGITAL CONVERTER

Filed July 22, 1959 2 Sheets-Sheet 1

INVENTORS
STANLEY B. DISSON
PAUL WINSOR III
BY
Frank N. Cullen
ATTORNEY

HIGH SPEED ANALOG-DIGITAL CONVERTER

Filed July 22, 1959 2 Sheets-Sheet 2

INVENTORS
STANLEY B. DISSON
PAUL WINSOR III
BY Frank H. Cullen
ATTORNEY

United States Patent Office 3,074,058

Patented Jan. 15, 1963

3,074,058

HIGH SPEED ANALOG-DIGITAL CONVERTER

Stanley B. Dissen, Broomall, and Paul Winsor III, Paoli, Pa., assignors to Burroughs Corporation, Detroit, Mich., a corporation of Michigan Filed July 22, 1959, Ser. No. 828,794
7 Claims. (Cl. 340—347)

This invention relates to analog to digital converters and more particularly to a high speed converter of the subtractive type. The invention is equally applicable as a digital to analog converter.

In the computer art, it is often required that an analog input value be converted to a digital value so that the computer can handle the information. Likewise it is often required that the digital output of a computer be converted to an analog value so as to activate or adjust some external device. The problem involved in obtaining such converters is twofold, accuracy and speed.

It is an object of our invention to provide a converter which has a high degree of accuracy.

It is another object of our invention to provide a converter which can handle the input or output of a computer at a high rate of speed so as not to delay the other functions of the computer.

It is still another object of our invention to provide a converter which is both highly accurate and which is at the same time relatively fast.

It is still a further object of our invention to provide a converter of the aforementioned characteristics in which after a computer word is complete, the word itself appears in the generator for a check.

It is another object of our invention to provide a converter which is not only capable of converting analog information into digital but is equally suitable for converting digital information into analog.

In brief, the objects of our invention are obtained by the use of several voltage generators in series, one for each bit in a binary word to be converted. Each of the voltage generators in the converter generates a different voltage, that is, each generator in the converter generates a voltage one-half of the preceding generator voltage. Each generator, then corresponds to a bit in a binary word, that is, an order of a binary number.

An input of an analog voltage opposite in polarity to the generated voltages is applied to all of the voltage generators throughout all of the time the conversion is taking place. In sequence, each generator generates its predetermined voltage and the cumulative sum of the last generated voltage and the preceding generated voltages which have been stored, is compared with the input voltage. If the cumulative sum is greater than the input voltage, an output pulse is initiated. The output pulses occur as the complement of the actual digital value, that is, a pulse will occur for ZEROS and no pulses will occur for ONES.

The components used in this converter can reasonably be held to tolerance values in the order of 0.5% to 1%. Consequently, the accuracy of such a converter can be held within these values.

The speed of the device is limited only by the switching time of the magnetic cores used. Even with presently available cores, switching times in the order of 0.7 microsecond are feasible. Consequently, with a cycle of two switchings of a core or 1.4 microseconds per bit, a seven bit conversion of 9.8 microseconds is very realistic.

A more complete understanding of the operation and features of the invention, together with additional objects thereof, may be gained from a reading of the following detailed description in connection with the accompanying drawings, in which.

Figure 1:
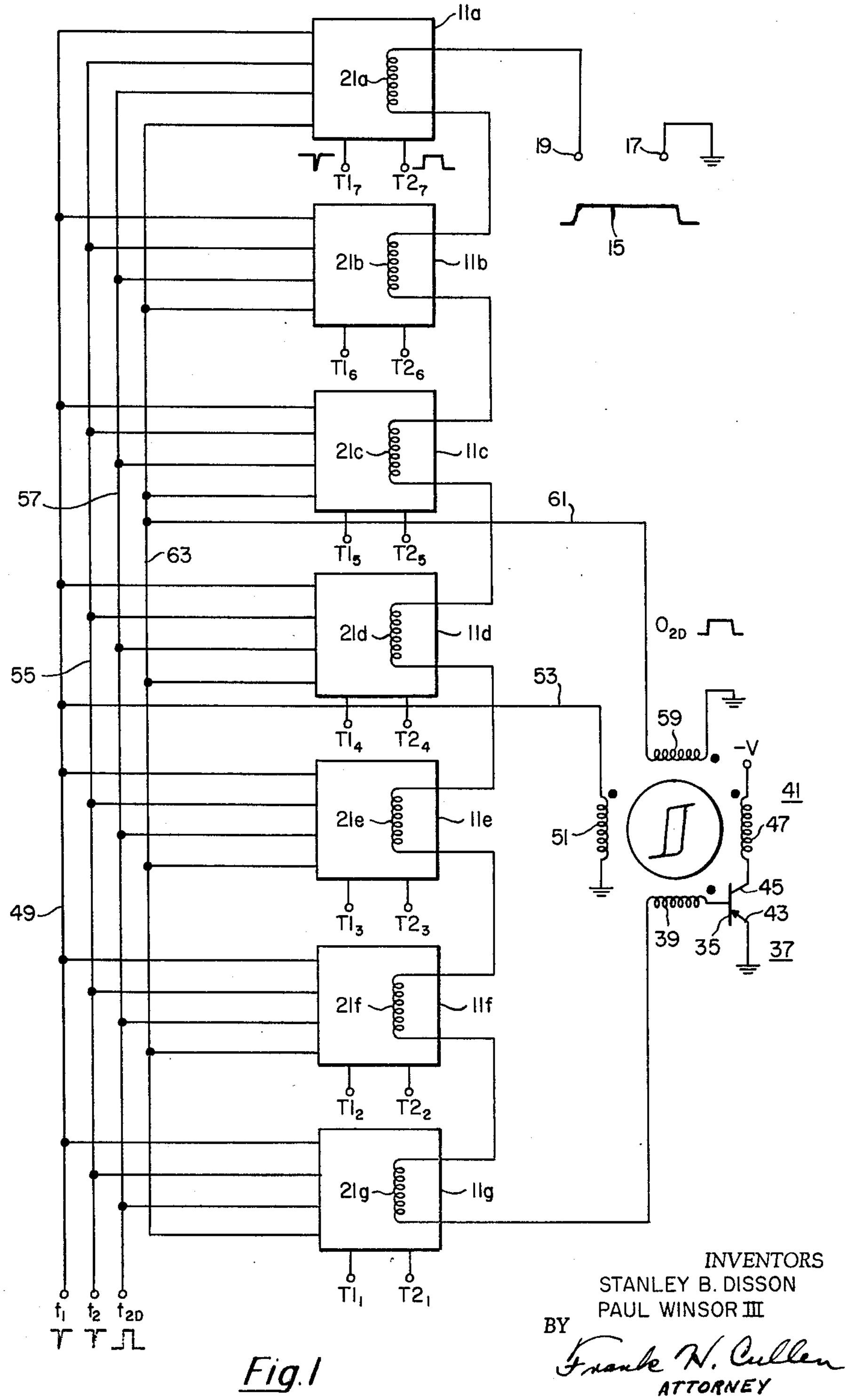
FIG. 1 is a block diagram of the overall converter.

FIG. 1 shows a block diagram for a seven bit converter. For each bit there is a voltage generator 11*a* through 11*g*. A source of voltage 15, to be measured, is applied to the terminals 17 and 19. Terminal 17 is connected to ground whereas the terminal 19 is connected to a series of windings 21*a* through 21*g*, one in each of the voltage generators. The number of turns in each of the windings 21*b* through 21*g* is one-half of the number of turns of the immediately preceding winding. As an example, the winding 21*a* may have sixty-four turns, the winding 21*b*, thirty-two turns, the winding 21*c*, sixteen turns, and so forth through the sequence.

The winding 21*g* is connected to the base 35 of the transistor 37 through the input winding 39 of the transistor magnetic core unit 41. The emitter 43 of the transistor 37 is connected to ground and the collector 45 is connected to a source of negative potential —V through the collector winding 47.

Figure 2:
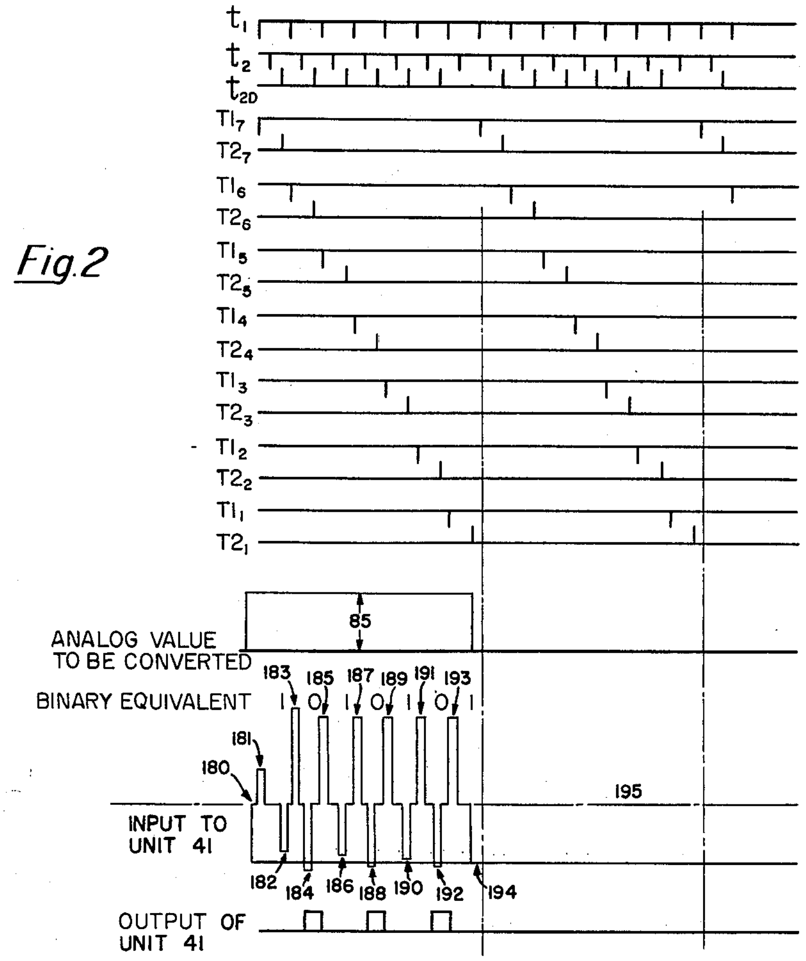
FIG. 2 is a chart showing the timing and polarity of the several voltages in the converter during a cycle.

Reference will now be made to FIG. 2 for the voltage waveforms as well as to FIG. 1 for the structure of the device. To each of the voltage generators, a source of negative reset pulses $t_1$ is applied through the line 49. This source of pulses $t_1$ is also applied to the winding 51 of transistor magnetic core unit 41 through the lines 49 and 53. A source of negative read-out pulses $t_2$ is applied to each of the voltage generators through the line 55. A third source of pulses $t_{2D}$, positive in polarity, is applied to each of the voltage generators through line 57.

The output winding 59 of transistor magnetic core unit 41 is connected on the one side to ground and on the other side to each of the voltage generators 11*a* through 11*g* through lines 61 and 63.

Also to each of the voltage generators 11*a* through 11*g*, are applied two individual sources of pulses identified generally as T1 and T2. $T1_7$ and $T2_7$ are applied to the voltage generator 11*a*, $T1_6$ and $T2_6$ are applied to voltage generator 11*b* and so forth through the sequence.

In operation, a positive voltage to be measured 15 is applied for all of the cycle of the conversion. Assuming the value of the voltage 15 is a nominal eighty-five, the binary equivalent of this will be 1010101 which should be registered by the converter.

The first in sequence is the $T1_7$ pulse at the voltage generator 11*a*. This pulse is coupled by a winding to the core on which winding 21*a* is also wound, as will be explained more fully in conjunction with the description of operation of FIG. 3 hereinafter. The $T1_7$ pulse sets the core on which the winding 21*a* is wound into its ONE state, which state will be utilized when the core is subsequently read out by the $t_2$ pulse. In reading out, the output of the voltage generator is negative with respect to the unknown voltage 15 and the algebraic sum of these two voltages is applied to the input winding 39 of the transistor magnetic core unit 41. Since the algebraic sum in this case (plus eighty-five compared with a minus sixty-four) is positive, the transistor 37 will not conduct and consequently no output pulse $O_{2D}$ on the winding 59 of the transistor magnetic core unit 41 will appear. The fact that no output pulse $O_{2D}$ appears on the winding 59, means that a ONE will be stored in the voltage generator 11*a* in a manner to be explained hereinafter. Also the same absence of an output pulse $O_{2D}$ can be used to write a ONE on some external device as the seventh bit of a binary code.

Second in sequence, a $T1_6$ pulse applied to voltage generator 11*b* drives the core on which the winding 21*b* is wound into the ONE state. Upon initiation by a pulse $t_2$ this most recently read-in pulse together with the ONE stored in the voltage generator 11*a* is compared with the unknown voltage 15. Since the sum of the two negative voltages, that is, the outputs of the voltage generators 11*a* and 11*b*, is sixty-four plus thirty-two which is greater than the eighty-five of the unknown voltage 15, the algebraic sum will be negative. When this is applied to the input winding 39 of the transistor magnetic core unit 41, an output pulse $O_{2D}$ will be produced on the winding 59. This output pulse $O_{2D}$ in conjunction with the $T2_6$ and $t_{2D}$ pulses serves to inhibit the storage of the ONE in voltage generator 11*b*. Although the same output pulse $O_{2D}$ from the winding 59 is applied to all of the voltage generators, the $T2_6$ pulse is applied, at this time, only to the voltage generator 11*b*. Consequently, only the ONE in the voltage generator 11*b* will be canceled. The output pulse $O_{2D}$ at the winding 59 can also be used to write a ZERO as the sixth bit of a binary code.

The sequence of the other voltage generators is similar to that mentioned above, the cumulative sum of each generated voltage being compared with the unknown voltage 15. If the cumulative sum at the time of any one of these comparisons is greater than the unknown voltage 15, an output pulse $O_{2D}$ will appear on the winding 59 and the most recently generated pulse will be canceled in a manner to be hereinafter described.

In order to clear the converter at the end of a seven bit word, an actuation pulse $t_{2D}$ which ordinarily allows the storage in the individual voltage generators is inhibited for the last generator cycle. However, it may be desired that at the end of a seven bit word the digital equivalent of the analog input 15 will not only appear on an external device actuated by the output pulse $O_{2D}$ on the winding 59, but will also appear in parallel in the several voltage generators. When such is desired the actuation pulse must also be applied for the last generator cycle. In order to clear the converter under these circumstances, after the digital equivalent is read from voltage generators, a $t_2$ pulse is applied to read out the generator. At this time, the actuation pulse $t_{2D}$ is inhibited and storage in the voltage generators will not be allowed.

Figure 3:
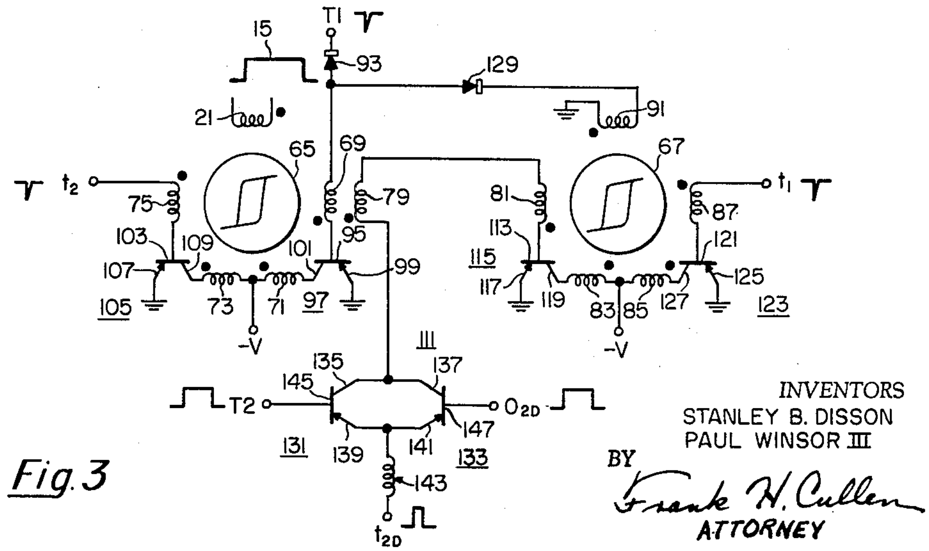
FIG. 3 is a schematic diagram of one of the voltage generators.

FIG. 3 shows a schematic of a voltage generator as used in this converter in each of the boxes 11*a* through 11*g* of FIG. 1. In essence, the generator comprises two rectangular hysteresis cores 65 and 67. About the core 65 are placed the input winding 69, read-in winding 71, read-out winding 73, read-out input winding 75, output winding 21 (comparable to windings 21*a* to 21*g* in FIG. 1) and the transfer winding 79. About the core 67 are placed the input winding 81, the read-in winding 83, the reset winding 85, the reset input winding 87 and the output winding 91.

The input winding 69 is connected to a source of pulses T1 through a diode 93. The other side of the input winding 69 is connected to the base 95 of the transistor 97. The emitter 99 of the transistor 97 is connected to ground while the collector 101 is connected to the read-in winding 71. The other side of the read-in winding 71 is connected to a source of negative voltage —V. The read-out input winding 75 is connected on the one side to a source of read-out pulses $t_2$ and on the other side to the base 103 of the transistor 105. The emitter 107 of the transistor 105 is connected to ground while the collector 109 is connected to a source of negative voltage —V through the read-out winding 73. The output winding 21 is connected to the source of unknown voltage 15; or alternatively, to the voltage which is the algebraic sum of the unknown voltage 15 and the voltages stored in preceding generators.

The transfer winding 79 is connected on the one side to a gating circuit 111 and on the other side to the input winding 81. The other side of the input winding 81 is connected to the base 113 of the transistor 115. The emitter 117 of the transistor 115 is connected to ground while the collector 119 is connected to a source of negative voltage —V through the read-in winding 83. The rest input winding 87 is connected on one side to a source of reset pulses $t_1$ while the other side of the winding 87 is connected to the base 121 of the transistor 123. The emitter 125 of the transistor 123 is connected to ground while the collector 127 is connected to a source of negative voltage —V through the reset winding 85. The output winding 91 is connected on one side to ground and on the other side to the input winding 69 through the diode 129.

The gating circuit 111 is comprised of two transistors 131 and 133. The collectors 135 and 137 of the transistors 131 and 133 are connected to the transfer winding 79. The emitters 139 and 141 are connected to a source of actuating pulses $t_{2D}$ through the coil 143. The base 145 of the transistor 131 is connected to a source of transfer pulses T2. The base 147 of the transistor 133 is connected to a source of output pulses $O_{2D}$. The $O_{2D}$ pulses are from the output coil 59 of transistor magnetic core unit 41 as shown in FIG. 1.

The operation of the circuit will be more fully understood by the use of the chart of FIG. 2, which shows the polarity and relative timing of the various pulses in the converter. It is evident from the diagram that a $t_1$ pulse occurs at the beginning of each voltage generator cycle. Also a T1 pulse occurs in a single voltage generator at the beginning of each voltage generator cycle and only one T1 pulse occurs in a given voltage generator during a seven bit cycle. A $t_2$ pulse serving to read out the core 65, occurs shortly after the $t_1$ and T1 pulses. This pulse, like the $t_1$ pulse, also occurs in each voltage generator, once for each generator cycle. The $t_{2D}$ pulse occurs at approximately the same time as the $t_2$ pulse and occurs once for each voltage generator cycle with the exception of the seventh bit at which time the $t_{2D}$ pulse is inhibited. As will be explained later, this is true only if it is not necessary to have the ordinal representation in the voltage generators at the end of a seven bit word. If it is desired to have such representation, the $t_{2D}$ pulse will appear in the seventh bit as well as in the other six and will be followed by an additional $t_1$ pulse and $t_2$ pulse in order to clear the converter.

At the time of the $t_{2D}$ pulse, a T2 pulse is applied in one and only one of the voltage generators, being the same generator to which a T1 pulse is also applied in the same voltage generator cycle. It will be noted that the T1 and T2 pulses progress from one voltage generator to the next, and in each case, the following voltage generator is one having a lesser number of turns in the output winding (that is, $T1_7$ is applied to voltage generator 11*a* having sixty-four turns in the output winding, followed by $T1_6$ being applied to voltage generator 11*b* having thirty-two turns in its output winding).

The analog value to be converted is shown in this instance to be eighty-five and the binary equivalent is 1010101. The input to the transistor magnetic core unit 41 (FIG. 1) shows the variation in voltage at the winding 39 of transistor magnetic core unit 41. The voltage representation of FIG. 2 entitled "Input to Unit 41" represents the voltage values at various pulse times. The voltage starts off at a value of 85 volts as shown by the reference numeral 180 and represents the application of the analog voltage to the windings 21*a* through 21*g*. Upon the application of pulses $t_1$ and $T1_7$, the core of the first voltage generator 11*a* will be driven into the ONE state. The voltage at winding 21*a* will now be equal to a value of 149, as evidenced by the portion of the curve 181. This voltage is the algebraic sum of the analog voltage and the voltage generated in the winding 21*a* (both in the same sense in this example, that is they are both positive) by the application of the input pulses. The portion of the curve 182 is at the time immediately after the application of pulses $t_2$, $t_{2D}$, and $T2_7$, at which time the core of voltage generator 11*a* is being read out and is equal to a value of 21 volts. That is, a comparison of the analog voltage 85 minus the 64 volts generated by the core on which winding 21*a* is wound yields a positive 21 volts. The portion of the curve along line 195 represents the analog voltage applied and occurs at the time when no ONE is being read in or out of cores of the individual voltage generators 11*a* through 11*g*. The portion of the curve 183 is equal to a value of 181 volts and represents the cumulative voltage of the ONE which was stored in generator 11*a*, because of the positive 21 volts resulting there, and the ONE read into generator 11*b* by the application of pulses $t_1$ and $T1_6$. Upon the application of pulses $t_2$, $t_{2D}$, $T2_6$, the cumulative negative voltage of 64 and 32 is compared to the unknown analog voltage, and in this case will result in a cumulative value of minus 11 volts (—64—32+85). Because of this negative cumulative voltage, the voltage generator now being pulsed, in this instance 11*b*, will not store a ONE. The application of pulses $t_1$ and $T1_5$ drives the core of voltage generator 11*c* into its ONE state, and since voltage generator 11*b* has no ONE stored therein, the only other voltage which will be added to the voltage of generator 11*c* will be the 64 volts of generator 11*a*. The portion of the curve 185 represents a voltage value equal to 165 volts, 85 plus 64 plus 16. The application of pulses $t_2$, $t_{2D}$, and $T2_5$ will read out the core of voltage generator 11*c* and therefore the portion of the curve 186 will represent a value of plus 5 volts (—64—16+85). In like manner, portion 187 represents a voltage of 173 volts (85+64+16+8); portion 188, a value of minus 3 volts (—64—16—8+85); portion 189, a value of 169 volts (85+64+16+4); portion 190, a positive one volt (—64—16—4+85); portion 191, a value of 171 volts (85+64+16+4+2); portion 192, a value of minus 1 volt (—64—16—4—2+85); portion 193, a value of 170 volts (85+64+16+4+1); and portion 194, a value of zero volts (—64—16—4—1+85).

The curve showing the output of transistor magnetic core unit 41 should be compared with the input to transistor magnetic core unit 41 and with the binary equivalent of the analog to be converted. It is noted that each time the input to the transistor magnetic core unit 41 goes negative, an output pulse is produced at transistor magnetic core unit 41. Also, each time an output pulse is made at transistor magnetic core unit 41, a ZERO is present in a binary equivalent of the analog value to be converted.

The operation of the circuitry of FIG. 3 during the binary conversion of the analog voltage 85 will now be explained in detail. This analog value is applied to the winding 21. At the beginning of the cycle, a T1 pulse is applied to the input winding 69 of the first voltage generator. This pulse is applied only to one voltage generator at a time. Simultaneously with the input pulse for each voltage generator, a reset pulse $t_1$ is applied to the reset input winding 87 on all of the voltage generators. Consequently, a ONE may be read into the core 65 either by the T1 pulse for that respective voltage generator or by transferring a ONE from the core 67 to the core 65 by the reset pulse $t_1$. This latter alternative can only be accomplished, however, when a ONE has previously been stored in the core 67 by means to be shown later.

Shortly after the application of the pulse on the input winding 69, collector current flowing in the transistor 97 and through the read-in winding 71 causes positive feedback to the transistor 97 and a ONE is consequently read into the core 65. Subsequently, a read-out pulse $t_2$ is applied through the read-out input winding 75 to the base 103 of the transistor 105. Collector current flowing from the transistor 105 through the read-out winding 73 causes positive feedback to the transistor 105 and consequent reading out of the ONE stored in the core 65. If a ONE has not been previously stored in the core 65 of this particular generator, the read-out voltage will be ZERO. The ZERO read-out will occur in all cases unless, as previously shown, an input pulse has been applied to the input winding 69.

At the time a ONE is being read out of the core 65, a negative voltage will appear in the output winding 21 and its value will be determined by the number of turns of the winding. In the case of voltage generator 11*a*, this will be a nominal value of sixty-four. Assuming again the instance of an analog value of eighty-five. it is clear that the algebraic sum of the positive analog value and the negative output voltage will be a plus twenty-one. This positive value is applied to the input winding 39 of the transistor magnetic core unit 41 (FIG. 1) and since it is positive, causes no output pulse $O_{2D}$ on the winding 59 of transistor magnetic core unit 41.

At the same time that the ONE is read-out on the output winding 21, it is also read-out on the transfer winding 79. At this time, a pulse T2 is applied to the base of the transistor 131 in the gating circuit 111. Also an actuating pulse $t_{2D}$ is applied to the emitters 139 and 141 in the gating circuit 111. The pulse T2 biases the transistor 131 such that it cannot conduct. However, since in this particular instance, there has been no output pulse $O_{2D}$ on the winding 59 of transistor magnetic core unit 41, no pulse appears at the base 147 in the gating circuit 111. Consequently, when the ONE is read onto the transfer winding 79, current will flow through the transistor 133, transfer winding 79 and the read-in input winding 81 to the base 113 of the transistor 115. Collector current in the transistor 115 will flow through the read-in winding 83 causing feedback in the transistor 115 and also causing the ONE to be read into core 67.

Subsequently, at the same time that a T1 pulse is read into the following voltage generator, a reset pulse $t_1$ is applied to all voltage generators. The $t_1$ pulse reads out the ONE stored in the core 67 if such ONE has been stored there. The ONE is transferred from the core 67 through the output winding 91 and the diode 129, the input read-in winding 69 to the base 95 of the transistor 97. The circuit associated with the core 65, treats the ONE read-in from the core 67 identically as if the ONE has been read in by a T1 pulse. Subsequently, a $t_2$ pulse reads out the ONE stored in the core 65 and if the gate 111 permits, allows the ONE to be read back into the core 67. In this instance, a T2 pulse will not appear for this voltage generator. Consequently, the transistor 131 will be able to conduct when the actuating pulse $t_{2D}$ and the read-out pulse $t_2$ appear. Therefore, if a ONE had previously been read into the core 67, it will be read into the core 67 again at the time each of the subsequent voltage generators reads out the ONE stored in the core 65 by the T1 pulse.

It will be seen that the cores and associated circuitry of each of applicants' generators comprise a generating means and a regenerating storage means controlled by a conditional transfer means. The coincidence of the sequential pulse T2 and an output from the common detection means 41 will inhibit the transfer of a pulse from the generating means 65 to the regenerating storage means 67. However, once this transfer is made, the pulse will be regenerated at every cycle through the reset pulse $t_1$ Also, each time a $t_2$ pulse appears in the voltage generator, the ONE read into the core 65 will not only be read back into the core 67 but will also be read onto the output winding 21, and since all the output windings 21 are in series as shown in FIG. 1, the ONE read out of each generator will be cumulative with the ONE's read onto the output windings 21 of all other voltage generators. In this fashion, the cumulative sum of the output voltages of the winding 21 is compared with the analog value 15 each time a $t_2$ pulse causes voltage generator output. If, on comparison with the analog value, the cumulative value is greater, an output pulse $O_{2D}$ will appear on the winding 59. This will cause the ONE stored in the core 65 by the T1 pulse to be inhibited since it will not be able to transfer to the core 67, the transistors 131 and 133 of the gate 111 each being biased off by the pulse T2 and the pulse $O_{2D}$, respectively. However, if the ONE in the core 65 is not read-in by a T1 pulse but by the reset pulse $t_1$, no T2 pulse will appear and the transistor 131 of the gate 111 will allow the ONE to be transferred from the core 65 to the core 67.

When the seventh bit voltage generator has been activated, the actuating pulse $t_{2D}$ is inhibited and transfer from the core 65 to the core 67 on all of the voltage generators is prevented. Consequently, all of the cores 67 will be in the ZERO state after the seventh bit. This readies the circuit for the following seven bit word.

As an added feature, it is possible to have the correct digital representation appear in the voltage generators after the seven bit cycle is complete. For this feature, however, instead of inhibiting the actuating pulse $t_{2D}$ in the seventh cycle, the pulse is applied as in the six previous cycles. It is then necessary only to apply an additional $t_1$ pulse after the seventh bit voltage generator has produced its voltage output, and the digital representation will appear in the cores 65 of the voltage generators. The converter can then be cleared by inhibiting the $t_{2D}$ pulse following the application of a $t_2$ pulse which will prevent read-in into the core 67.

To use the invention as a digital to analog converter rather than an analog to digital converter, the digital inputs can be applied to all of the voltage generators simultaneously by T1 pulses as generated by a shift register or a bank of binary elements. This input device, a shift register or a bank of binary elements, will provide 7 signals in binary coded form, and for example let us suppose that we wish to convert the binary number 56, 0111000, to its analog equivalent. These 7 signals will be transmitted on T1 input lines to the plurality of voltage generators 11*a* through 11*g*, and thus transfer the respective cores 65 of each of these generators into states 0111000, respectively. Subsequently, at a selected read-out time, after all of the cores have been set, a pulse is applied, in the same fashion as read-out pulse $t_2$ is applied in the analog-to-digital arrangement, to read out all of the cores 65 at the same time. The voltages produced by those cores 65 in generators 11*a* through 11*g* which are switched (11*b*, 11*c*, and 11*d* in our example) will be added in the windings 21*a* through 21*g* to produce a pulse having a value of 56. The cores 65 in each of the generators are transferred into the ZERO state, and are prepared for the next digital pulse representation.

The foregoing description is of a specific embodiment of our invention and is not to be understood as the limits of the scope of the invention. It is obvious that NPN rather than PNP transistors could be used and that the polarity of the pulses would consequently be reversed. Also the output of the transistor magnetic core unit 41 could be changed to allow pulses for ONE's instead of ZERO's. In such an embodiment the pulses could be used to overcome a bias on the transistor 133 in the gating circuit 111 and the overall operation would be identical. For a binary converter the nominal number of turns on the windings 21 could also be increased by any integral factor so long as the proportional relationships remain the same and the number of bits per word can be increased or decreased by merely adding or subtracting generators, keeping in mind the relationship of the turns on the winding to the order of the bit.

Likewise instead of the transistor-magnetic core combination shown, other bistable devices could be substituted. Also other gating techniques could be substituted for the circuit 111. These and other variations of the invention are considered within the scope of our invention which is limited only to that defined in the claims below.

We claim:

1. An analog to digital converter comprising a plurality of sequentially operative voltage generators, each having therein a generating means and an associated regenerating storage means, said storage means comprising a substantially square hysteresis loop magnetic core, each of said generators having an output voltage value twice that of its succeeding generator, the output of each of said regenerating storage means being coupled to the input of its associated generating means, input means serially connected to all of said generators for applying an input voltage to be converted, conditional transfer means individually coupling the output of each said generating means to the input of its associated regenerating storage means, and common detection means coupled to the outputs of all of said generating means for comparing said input voltage with the cumulative voltage outputs of said generators, said detection means also being coupled to all of said conditional transfer means, whereby said detection means controls the continued output of said generators as determined by said voltage comparison.

2. An analog to digital converter as described in claim 1 including an output means coupled to said detection means.

3. An analog to digital converter as described in claim 1 including an output means coupled to said storage means.

4. An analog to digital converter comprising a plurality of voltage generators, each of said voltage generators having a voltage output value twice that of its succeeding generator, each of said generators including a first and a second rectangular hysteresis core, a read-in winding wound on each said core, a read-out winding wound on each said core, conditional transfer means including a gate coupled between said first core and said read-in winding of said second core, an output winding wound on said second core and regeneratively coupled to said read-in winding of said first core, input means coupled to said first core for applying input voltage to be converted, and detection means for comparing said input voltage with the voltage output of said generators coupled to said gate to determine read-in to said second core.

5. An analog to digital converter comprising a plurality of voltage generators, each of said generators having a voltage output value twice that of its succeeding generator, each of said generators also having a first and a second rectangular hysteresis core, input pulse means coupled in sequence to each said first core, read-out pulse means coupled to each said second core, a first transfer circuit coupled between said first and said second core of each said generator, said first transfer circuit including a gate, gating pulse means coupled to each said gate, a second transfer circuit regeneratively coupling said second core to said first core of each said generator, and detection means serially coupled to all of said first cores, the output of said detection means being coupled to all of said gates, whereby said voltage output of each of said generators may be controlled by said detection means by inhibiting transfer from said first core to said second core.

6. A device for converting an analog input signal voltage to digital form comprising a plurality of pulse generators connected in series to said input voltage, each of said generators having an output voltage value twice that of its succeeding generator and having therein two bistable devices, the output of each being coupled to the input of the other for pulse regeneration and conditional transfer means coupled between said bistable devices, means to cause each of said generators to commence operating sequentially, means for adding said voltage outputs cumulatively, and common detection means for comparing said input voltage with said sequential and cumulative output voltages, the output of said detection means being individually coupled to each said conditional transfer means, so as to allow pulse regeneration in selected ones of said generators as determined by the said voltage comparison.

7. A device for converting an analog input signal to digital form comprising a plurality of pulse generators, each of said generators having a first and a second substantially square loop hysteresis core, a first core output winding wound on said first core, the voltage output of said winding of each generator being twice that of the corresponding winding of its succeeding generator, a second core read-in winding wound on said second core, a transfer circuit including a gate, a transfer winding wound on said first core and coupled to said second core read-in winding through said transfer circuit, a first core read-in winding wound on said first core, a second core output winding wound on said second core and coupled to said first core read-in winding, a read-out winding wound on said first core, a reset winding wound on said second core, a common detection means having an output, means connecting all of said first core output windings in series opposition with the said input signal to said detection means for a comparison of the relative magnitudes of the sum of selected ones of said first core output winding outputs and said input signal, means connecting the output of said detection means to each of said gates, set pulse means coupled in sequence to each said first core read-in winding for setting each said first core to one of its remanent states, periodic read-out pulse means coupled to all of said read-out windings, said read-out pulse causing said output voltage in said output winding and a pulse in said transfer winding of previously set first cores, gate inhibiting pulse means coupled in sequence to each said gate, periodic transfer actuating pulse means coupled to all said gates for effecting a transfer of said output pulse in said transfer winding to said second core, said transfer being subject to a non-coincidence of said detector output and said gate inhibiting pulse, and periodic reset pulse means coupled to all said reset windings, said reset pulses causing an output pulse in said second core output winding of all said second magnetic cores to which said pulse transfer was made.

References Cited in the file of this patent

UNITED STATES PATENTS

| | | |
|---|---|---|
| 2,754,503 | Forbes | July 10, 1956 |
| 2,875,432 | Markow | Feb. 24, 1959 |
| 2,972,136 | Gieseler | Feb. 14, 1961 |